United States Patent
Tanaka

[11] Patent Number: 5,488,513
[45] Date of Patent: Jan. 30, 1996

[54] ZOOM LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 106,574

[22] Filed: Aug. 16, 1993

[30] Foreign Application Priority Data

Aug. 17, 1992 [JP] Japan .................... 4-217919

[51] Int. Cl.$^6$ .................................. G03B 7/00
[52] U.S. Cl. .................... 359/699; 359/700; 359/695; 359/701; 359/704
[58] Field of Search .................... 359/694, 695, 359/696, 699, 700, 701, 702, 703, 704

[56] References Cited

U.S. PATENT DOCUMENTS

| | | | |
|---|---|---|---|
| 3,951,522 | 4/1976 | Hashimoto | 350/187 |
| 4,993,815 | 2/1991 | Yamzaki | 350/429 |
| 5,037,187 | 8/1991 | Oda | 359/699 |
| 5,144,493 | 9/1992 | Nomura | 359/700 |
| 5,164,757 | 11/1992 | Nomura | 354/403 |
| 5,231,449 | 7/1993 | Nomura | 354/485 |
| 5,270,868 | 12/1993 | Nomura | 359/700 |

FOREIGN PATENT DOCUMENTS 3209445  9/1991  Japan .

Primary Examiner—Georgia Y. Epps
Assistant Examiner—Ricky Mack
Attorney, Agent, or Firm—Sandler, Greenblum, & Bernstein

[57] ABSTRACT

A zoom lens barrel is provided including a cam ring which is threadedly engaged to a female helicoid formed in a stationary barrel, a linear movement guide member that is rotatable relative to the cam ring and movable in an optical axis direction together with the cam ring, and movable lens groups, including first, second and third lens groups that are guided in the optical axis direction by the linear movement guide member. The zoom lens barrel further includes a female helicoid formed on an inner peripheral surface of the cam ring to engage with a male helicoid of a first lens frame which holds the first lens group and a plurality of cam grooves formed on the cam ring to drive lens groups behind the first lens group.

14 Claims, 9 Drawing Sheets

ZOOM LENS BARREL

BACKGROUND OF THE INVENTION

1. Field of the Invention

The present invention relates to a zoom lens barrel. More precisely, the invention relates to a zoom lens barrel having at least three groups of movable lenses.

2. Description of Related Art

There are basically two types of zoom lenses having three lens groups. A first type has a cam ring which is provided with cam grooves to move the three lens groups. A second type includes cam grooves formed on two or more cam rings, which are rotated in association with each other, for moving the three lens groups. However, in the first type, there is little freedom of design, since the three cam grooves must be formed on a single cam ring without interfering with each other. Consequently, it is necessary to increase the inclination angles of the cam grooves in order to reduce an angular displacement of the cam ring from the shortest focal length to the longest focal length. However, the increased inclination angle of the cam grooves requires an increased force to rotate the cam ring. On the other hand, in the second type mentioned above, the provision of a plurality of cam rings requires a large space and the manufacturing cost is high.

SUMMARY OF THE INVENTION

The assignee of the present application has proposed an improved zoom lens barrel having two lens groups (i.e., front and rear lens groups), wherein a cam ring that is threadedly-engaged with a stationary lens barrel through a helicoid is provided with a threaded portion (i.e., a helicoid) with which a front lens frame threadedly-engages and a cam groove for the rear lens group (e.g., Japanese Unexamined Patent Publication No. HEI 3-209445, U.S. Ser. No. 07/602, 176, or U.S. Ser. No. 08/074,723 which is a continuation of U.S. Ser. No. 07/602,176). In the improved zoom lens barrel mentioned above, the front lens group is engaged by the cam ring through the helicoid. Accordingly, the front lens group is resistant to shock. Furthermore, since the cam ring is moved in the optical axis direction while being rotated, the inclination of the cam groove can be made small. Accordingly, a small force is required to rotate the cam ring.

The present invention relates to further improvement in the zoom lens barrel described in JPP '445 mentioned above. Namely, the primary object of the present invention is to provide a simple zoom lens barrel which can be easily assembled.

To achieve the object mentioned above, according to the present invention, a zoom lens barrel is provided which includes a cam ring that is threadedly engaged to a helicoid formed on a stationary barrel, a linear movement guide member that is rotatable relative to the cam ring and movable in an optical axis direction together with the cam ring. At least three movable lens groups, including first, second and third lens groups that are guided in the optical axis direction by the linear movement guide member. The first, second and third lens groups are located in this order from an object side of the zoom lens barrel. A first lens frame holds the first lens group and is provided with a helicoid, wherein another helicoid is formed on the cam ring to engage with the helicoid of the first lens frame, and a plurality of cam grooves are formed on the cam ring to drive lens groups behind the first lens group.

According to another aspect of the present invention, a zoom lens barrel is provided which includes a rotatable cam ring, an annular member that is threadedly engaged to the cam ring through helicoids, and a linear movement guide member that linearly guides the annular member in an optical axis direction. A linear movement guide groove corresponding to the linear movement guide member which is formed on the linear movement guide member, a cutaway portion is formed at one end of the linear movement guide groove and is inclined at an angle identical to the angle of the helicoids between the cam ring and the annular member. A linear movement key that projects rearwardly from the inner surface of the annular member and is fitted in the linear movement guide groove through the cut-away portion.

According to still another aspect of the present invention, a zoom lens barrel is provided which includes a rotatable cam ring having at least two open-ended cam grooves provided on an inner peripheral surface thereof. Also provided are two movable lens frames having cam pins which are fitted in the open ends of the cam grooves of the cam ring, and a linear movement guide member, that linearly guides the movable lens frames in the optical axis direction without rotating, wherein the open ends of the cam grooves are located so that the cam pins cannot simultaneously engage with the open ends of the corresponding cam grooves at a single angular position of the cam ring.

The present disclosure relates to subject matter contained in Japanese patent application No. HEI 4-217919 (filed on Aug. 17, 1992) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
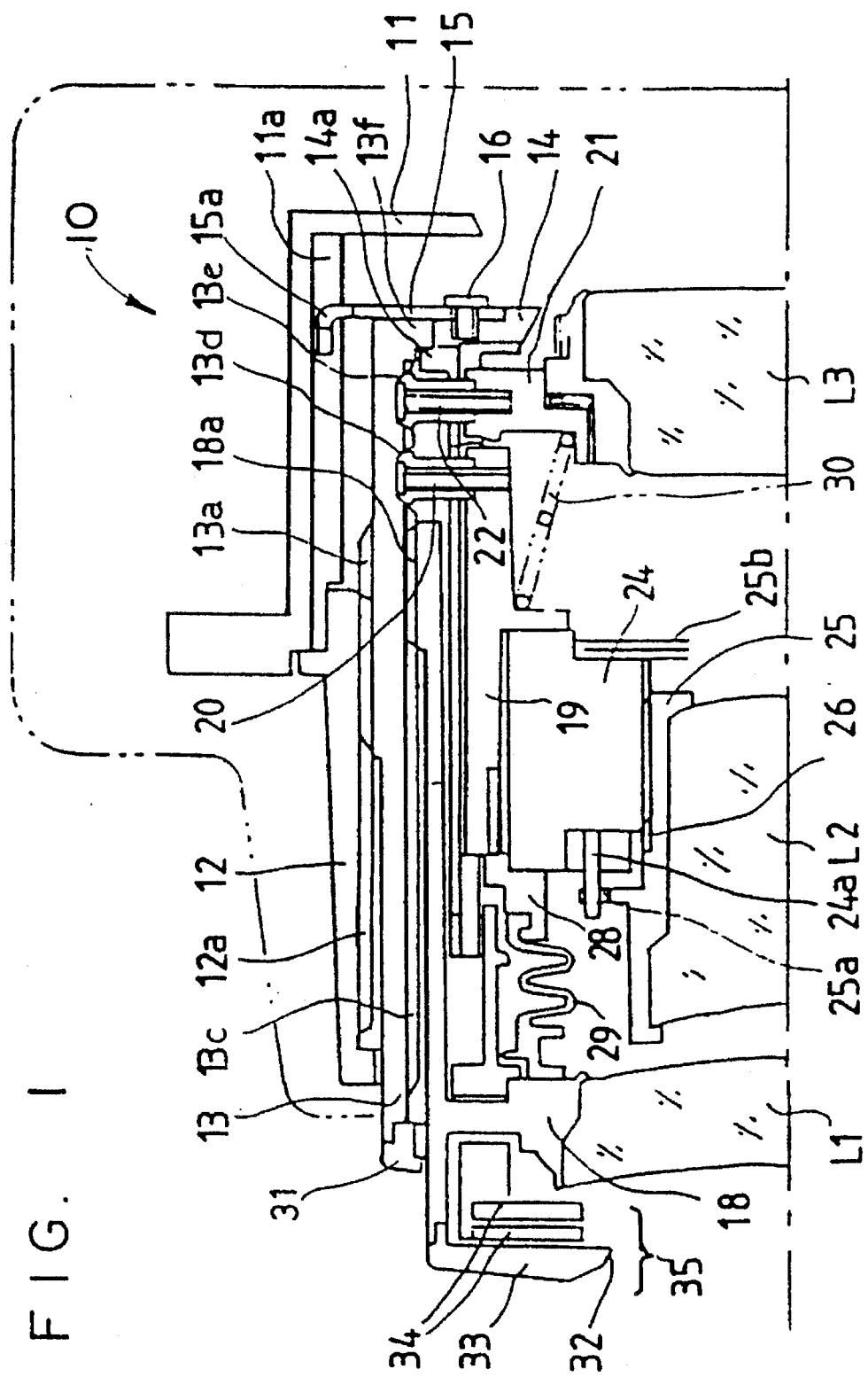
FIG. 1 is a longitudinal sectional view of an upper half of a zoom lens barrel shown in a shortest focal length position, according to the present invention.
Figure 2:
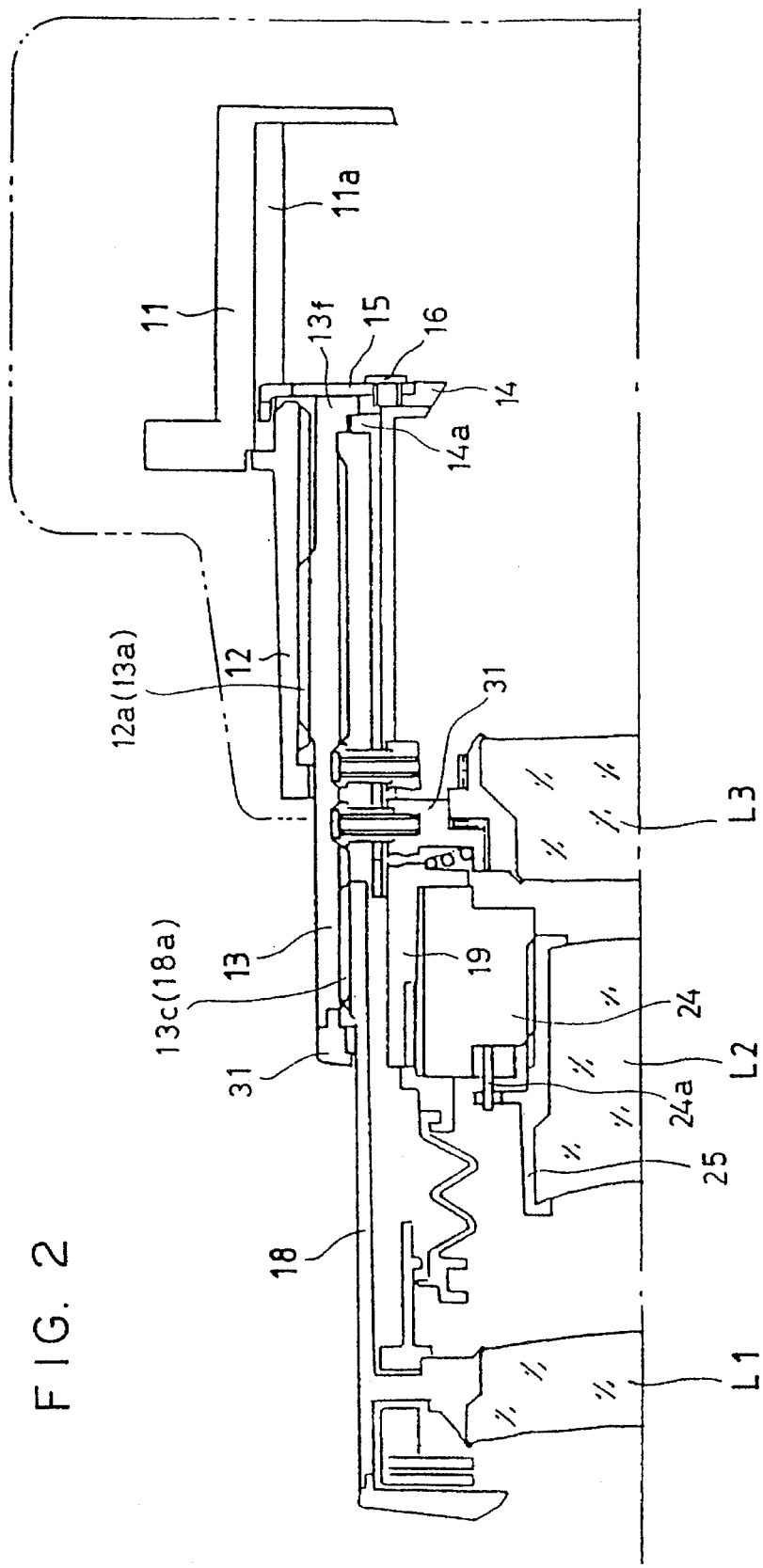
FIG. 2 is a longitudinal sectional view of an upper half of a zoom lens barrel shown in a longest focal length position, according to the present invention.
Figure 3:
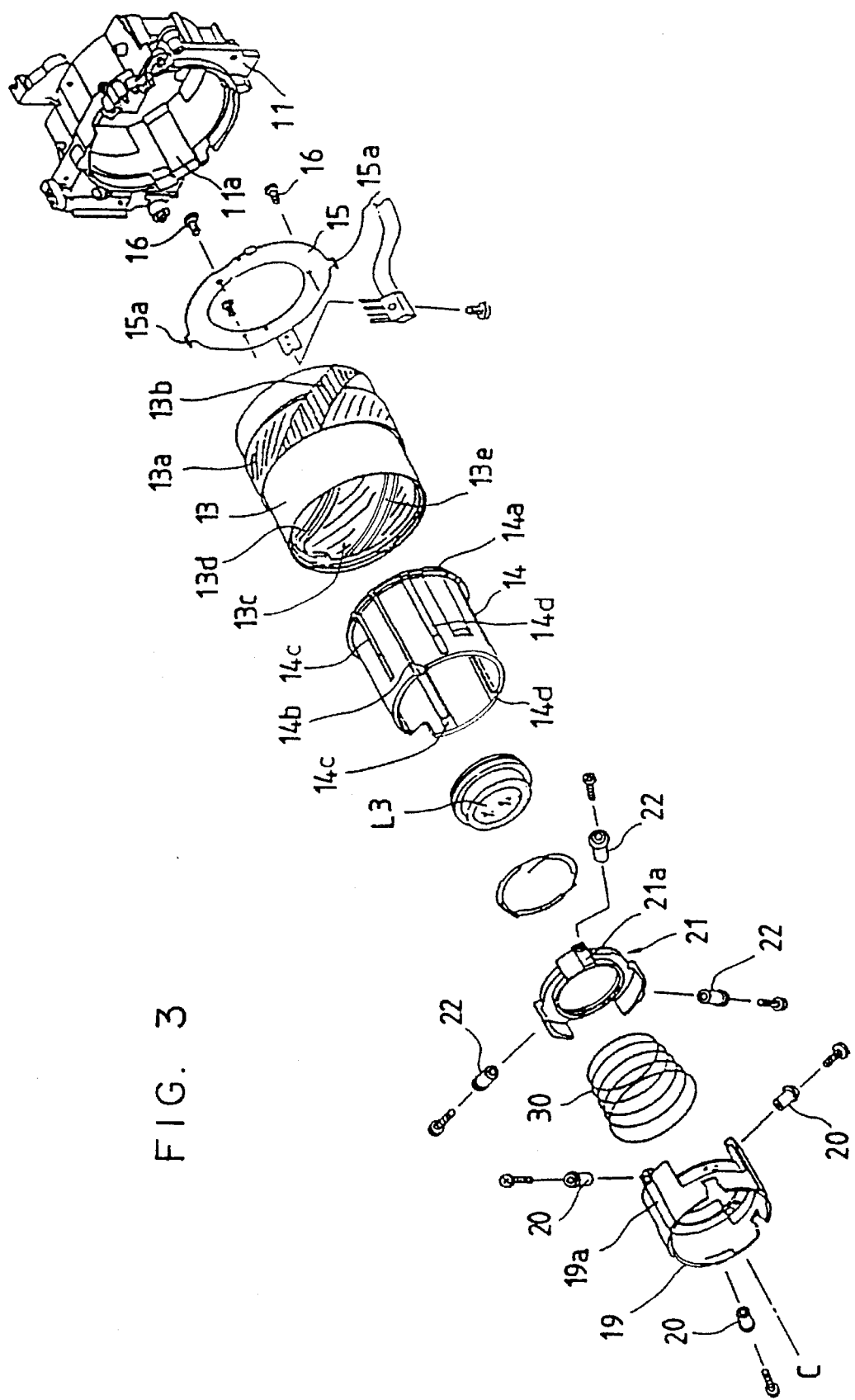
FIGS. 3 and 4 are exploded isometric views of a zoom lens barrel according to the present invention.
Figure 4:
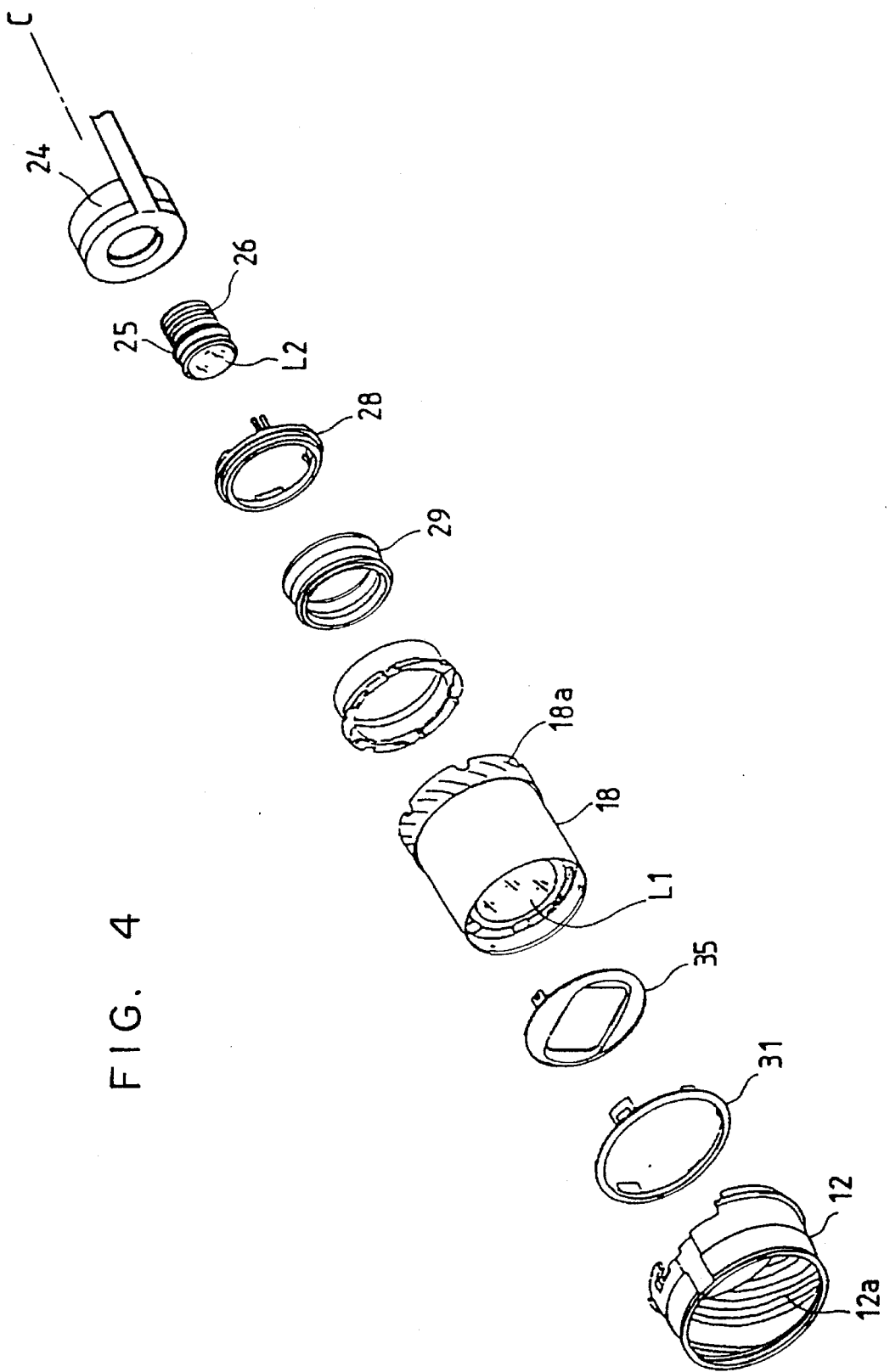
Figure 5:
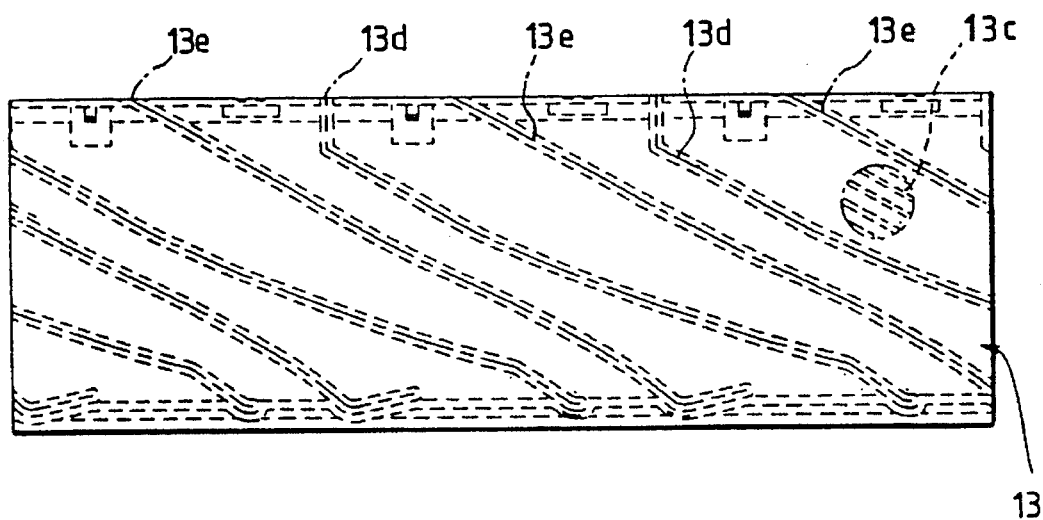
FIG. 5 is a developed view of cam grooves provided on an inner peripheral surface of a cam ring, according to the present invention.
Figure 6:
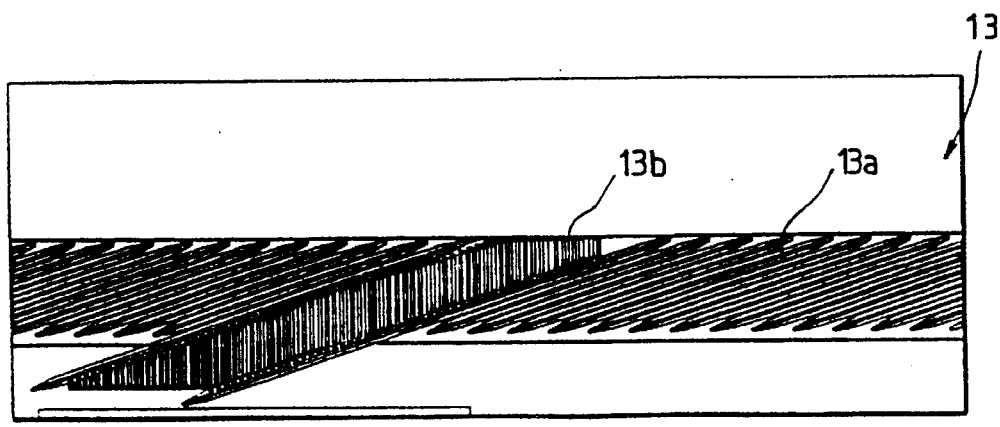
FIG. 6 is a developed view of a helicoid and a gear provided on an outer peripheral surface of a cam ring, according to the present invention, by way of example.

A zoom lens barrel basically includes three movable lens groups consisting of a first lens group L1, a second lens group L2, and a third lens group L3. The three movable lens groups are moved in the optical axis direction to carry out a zooming operation. To effect the focusing operation, the second lens group L2 is moved in the optical axis direction relative to the first and third lens groups.

A stationary lens barrel mechanism 10 comprises a stationary lens barrel 11 secured to a camera body. A helicoid ring 12 is secured to stationary lens barrel 11. Stationary lens barrel 11 is provided with linear movement guide grooves 11a extending parallel to the optical axis. The helicoid 12 is provided on an inner peripheral surface thereof with a female helicoid 12a.

The cam ring 13 is fitted in the helicoid ring 12. The cam ring 13 is provided on an outer peripheral surface thereof with a male helicoid 13a which engages with the female helicoid 12a, and a spur gear 13b which is angled in the direction of the lead of the male helicoid 13a. The spur gear 13b is engaged by a pinion (not shown) which rotates at a predetermined position.

The cam ring 13 is provided on an inner peripheral surface thereof with a female helicoid 13c for the first lens group L1, and inner cam grooves 13d and 13e for the second and third lens groups L2 and L3, respectively. The inner cam grooves 13d and 13e open at front ends thereof into the end face of the cam ring 13. The inner cam grooves 13d and 13e each include a plurality of grooves spaced in the circumferential direction of the cam ring 13 and are formed by partially cutting away the female helicoid 13c.

A linear movement guide ring 14 is fitted in the cam ring 13. The linear movement guide ring 14 is provided on the rear end thereof with an outer flange 14a which engages with an inner flange 13f of the cam ring 13. A linear movement guide plate 15 is secured to the rear end of the linear movement guide ring 14 by machine screws 16 to rotatably hold the inner flange 13f between the linear movement guide plate 15 and the outer flange 14a. The linear movement guide plate 15 has radial projections 15a which are fitted in the linear movement guide grooves 11a of the stationary barrel 11. Consequently, the linear movement guide ring 14 is rotatable relative to the cam ring 13 and moves in the optical axis direction together with the cam ring 13.

A first lens frame 18, to which the first lens group L1 is secured, is provided with a male helicoid 18a which is engaged by the female helicoid 13c of the cam ring 13. The directions of the leads of the female helicoid 13c and the male helicoid 18a are opposite to those of the female helicoid 12a and the male helicoid 13a. Cam pins 20, provided on the outer peripheral surface of a second lens moving frame 19, are fitted in the inner cam groove 13d of the cam ring 13. Similarly, cam pins 22, provided on the outer peripheral surface of a third lens frame 21 to which the third lens group L3 is secured, are fitted in the inner cam groove 13e of the cam ring 13.

A second lens frame 25, to which the second lens group L2 is secured, is provided with a threaded portion 26 which is screw-engaged in an AF/AE unit 24. The AF/AE unit 24 is secured to the second lens moving frame 19. The AE/AF unit 24 is provided with a drive pin 24a which is rotated by an angular displacement in accordance with object distance data. The drive pin 24a is engaged by an association arm 25a which projects from the second lens frame 25 in the radial direction. Consequently, the second lens frame 25, and accordingly, the second lens L2 are moved in the optical axis direction in accordance with the angular displacement of the drive pin 24a and the lead of the threaded portion 26 of the second lens frame 25 to effect the focusing operation. The AE/AF unit 24 opens and closes shutter blades 25b in accordance with brightness data of an object to be photographed when a shutter is released.

Figure 11:
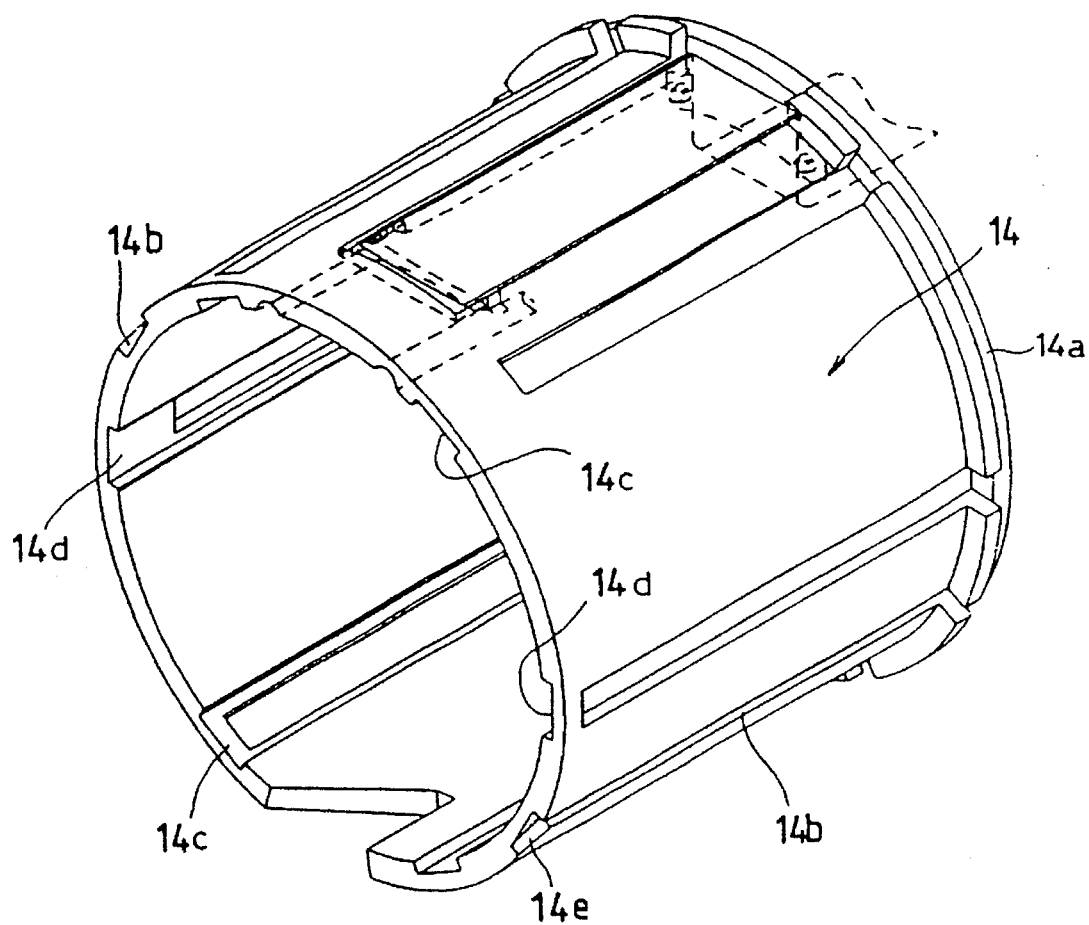
FIG. 11 is an isometric view of a single linear movement guide ring, according to the present invention; and, FIG. 12 is a longitudinal sectional view of an upper half of a first lens frame, according to the present invention.
Figure 12:
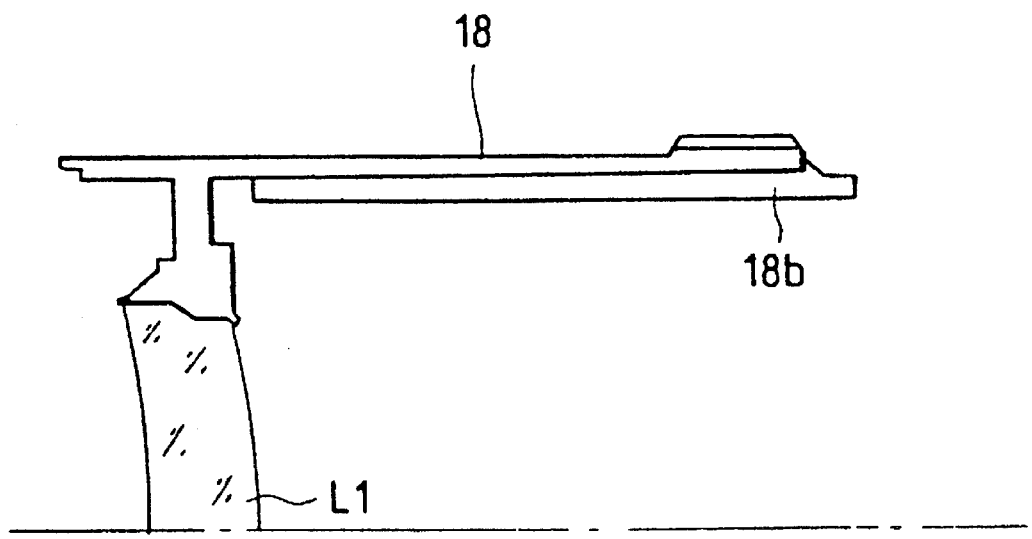

The first lens frame 18 (i.e., first lens group L1), the second lens moving frame 19 (i.e., second lens group L2), and the third lens frame 21 (i.e., third lens group L3) are linearly guided by the linear movement guide ring 14. Namely, the first lens frame 18 is provided on the inner peripheral surface thereof with linear movement keys 18b which are fitted in the linear movement guide grooves 14b (FIG. 11) formed on the outer surface of the linear movement guide ring 14, as can be seen in FIG. 12. The second lens moving frame 19 and the third lens frame 21 are provided on the outer surfaces thereof with linear movement keys 19a and 21a which extend parallel to the optical axis and which are fitted in the linear movement guide grooves 14c and 14d formed on the inner surface of the linear movement guide ring 14 and extend in the optical axis direction, respectively. The cam pins 20 and 22 are secured to the rear ends of the linear movement guide keys 19a and 21a and extend through the linear movement guide grooves 14c and 14d, so as to be fitted in the inner cam grooves 13d and 13e, respectively.

A light intercepting bellows 29 is provided between the first lens frame 18 and the second lens moving frame 19 through a bellows mounting ring 28. A compression spring 30 is inserted between the second lens moving frame 19 and the third lens frame 21 to bias them away from one another. The coil spring 30 absorbs play between the cam pins 20 and the inner cam groove 13d, and between the cam pins 22 and the inner cam groove 13e, respectively.

The cam ring 13 is provided on the front end thereof with a light intercepting ring 31 which comes into sliding contact with the outer peripheral surface of the first lens frame 18. A cover 33 having a photographing aperture 32 and a barrier block 35 having barriers 34, which open and close the photographing aperture, are provided on the front end of the first lens frame 18.

The zoom lens barrel, as constructed above, operates as follows.

When the pinion (not shown), which engages with the spur gear 13b of the cam ring 13, is rotated by the motor (not shown) towards the shortest focal length position shown in FIG. 1, the cam ring 13 is advanced in the optical axis direction, in accordance with the engagement of the male helicoid 13a and the female helicoid 12a. As a result, the first lens frame 18, which is guided by the linear movement guide ring 14, is further advanced with respect to the cam ring 13, in accordance with the relationship between the male helicoid 18a and the female helicoid 13c having different lead directions than of helicoids 12a and 13a.

Similarly, the rotation of the cam ring 13 causes the second lens moving frame 19 and the third lens frame 21, which are both guided by the linear movement guide ring 14, to move forward in the optical axis direction, in accordance with the profiles of the inner cam grooves 13d and 13e of the cam ring 13 to thereby effect the zooming operation, since the respective cam pins 20 and 22 are fitted in the corresponding inner cam grooves 13d and 13e.

The displacement of the first lens group L1 in the optical axis direction during the zooming operation is identical to the axial displacement of the cam ring 13 caused by the female and male helicoids 12a and 13a plus the axial displacement of the first lens frame 18 caused by the female and male helicoids 13c and 18a. The axial displacement of the second and third lens groups L2 and L3 is identical to the axial displacement of the cam ring 13 caused by the female and male helicoids 12a and 13a plus the axial displacement of the second lens moving frame 19 and the third lens frame 21 caused by the inner cam grooves 13d and 13e. Therefore, it is possible to obtain a large axial displacement of the first, second and third lens groups L1, L2 and L3 by a small angular displacement of the cam ring 13. Moreover, the inclination angle of the inner cam grooves 13d and 13e can be decreased. Accordingly, the cam ring 13 can be rotated by a small driving force.

Figure 7:
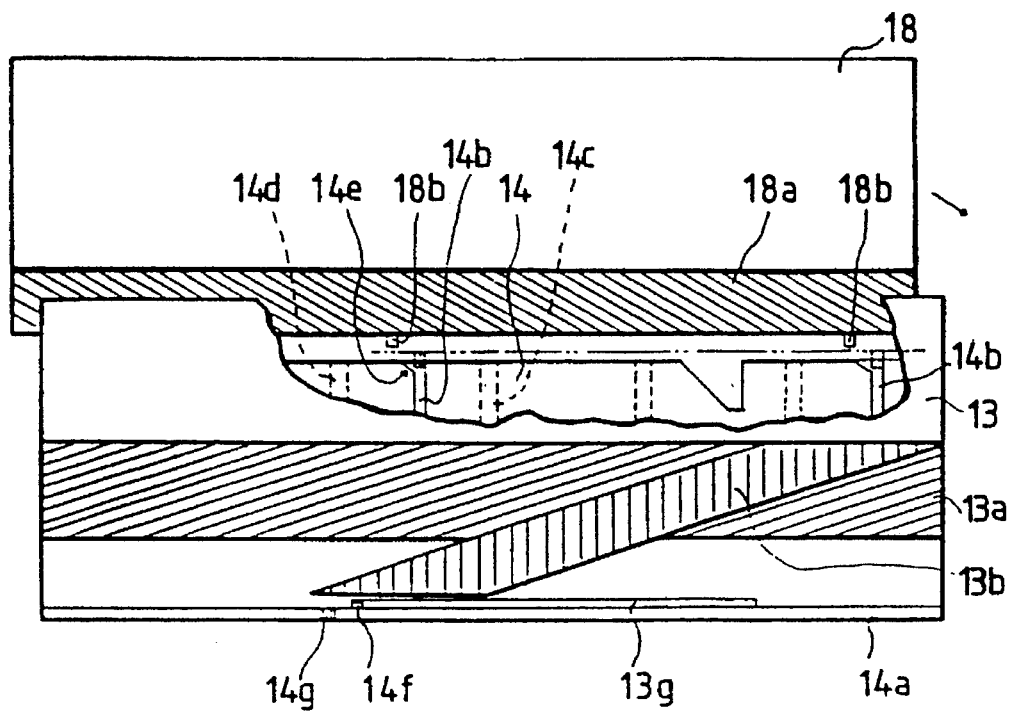
FIG. 7 is a developed view of a cam ring, a linear movement guide ring, and a first lens supporting frame in assembly, according to the present invention.
Figure 8:
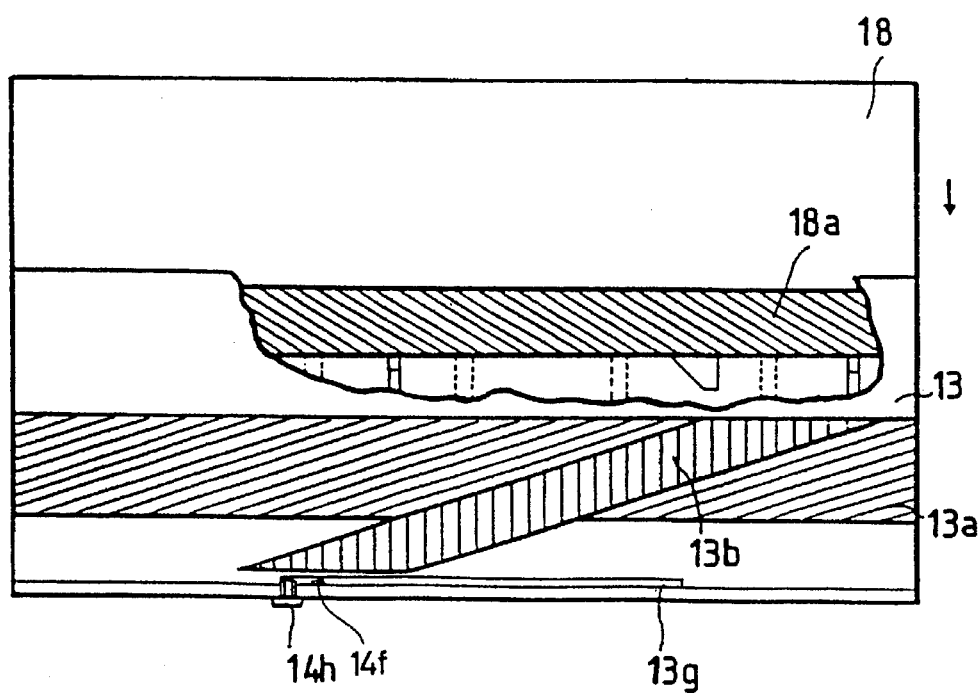
FIG. 8 is a developed view of a cam ring, a linear movement guide ring, and a first lens supporting frame in assembly, shown in a position different from FIG. 7, according to the present invention.

It should be recalled here that the second lens group L2 and the third lens group L3 are continuously biased by the compression coil spring 30 away from one another to eliminate play between the inner cam grooves 13d and 13e, and the corresponding cam pins 20 and 22. Accordingly, the present invention can be advantageously used particularly when the second lens group L2 and the third lens group L3 are highly sensitive. FIGS. 7 and 8 show a guide means provided on the linear movement guide ring 14 for determining an engagement position in which the screw-engagement of the female helicoid 13c of the cam ring 13 and the male helicoid 18a of the first lens frame 18 in the circumferential direction begins.

The threaded-engagement of the female helicoid 13c and the male helicoid 18a must begin at a specific position to determine the axial position of the first lens frame 18 (i.e., first lens group L1). Accordingly, the inlet ends of the linear movement guide grooves 14 are provided with inclined guide surfaces 14e whose angles correspond to the lead of the male helicoid 18a. Furthermore, the linear movement guide ring 14 is provided on the rear end thereof with a stop projection 14f and a threaded hole 14g for a stop screw 14h (see FIG. 8). The stop projection 14f is fitted in a rotation restricting groove 13g formed in the rear end of the cam ring 13. Upon assembling the cam ring 13, the linear movement guide ring 14, and the first lens frame 18, the cam ring 13 is rotated with respect to the linear movement guide ring 14 in the clockwise direction as viewed from the film plane side, as shown in FIG. 7, so that one end of the rotation restricting groove 13g comes into contact with the stop projection 14f. This is a reference position (corresponding to the specific engagement position) in which the cam ring 13 is rotated beyond the longest focal length position. In this state, the male helicoid 18a of the first lens frame 18 is engaged by the female helicoid 13c of the cam ring 13. It should be appreciated that the guide surfaces 14e and the linear movement keys 18b are placed so that the male helicoid 18a of the first lens frame 18 can be engaged by the female helicoid 13c of the cam ring 13 only in the reference position in which the linear movement keys 18b, projecting backward from the inner surface of the first lens frame 18 is guided by the guide surfaces 14e to be fitted in the linear movement guide grooves 14b. Thus, the male helicoid 18a of the first lens frame 18 can be engaged by the female helicoid 13c of the cam ring 13 at the specific engagement position.

In the engagement position in which the male helicoid 18a engages with the female helicoid 13c, when the cam ring 13 is rotated in the counterclockwise direction, as viewed from the film plane side, the stop projection 14f comes away from the one end of the rotation restricting groove 13g. Thereafter, the stop screw 14h is screwed in the threaded hole 14g to complete the assembly. In this state, since the rotation of the cam ring 13 is mechanically limited by the stop screw 14h and the other end of the rotation restricting groove 13g, the first lens frame 18 will not be detached.

Figure 9:
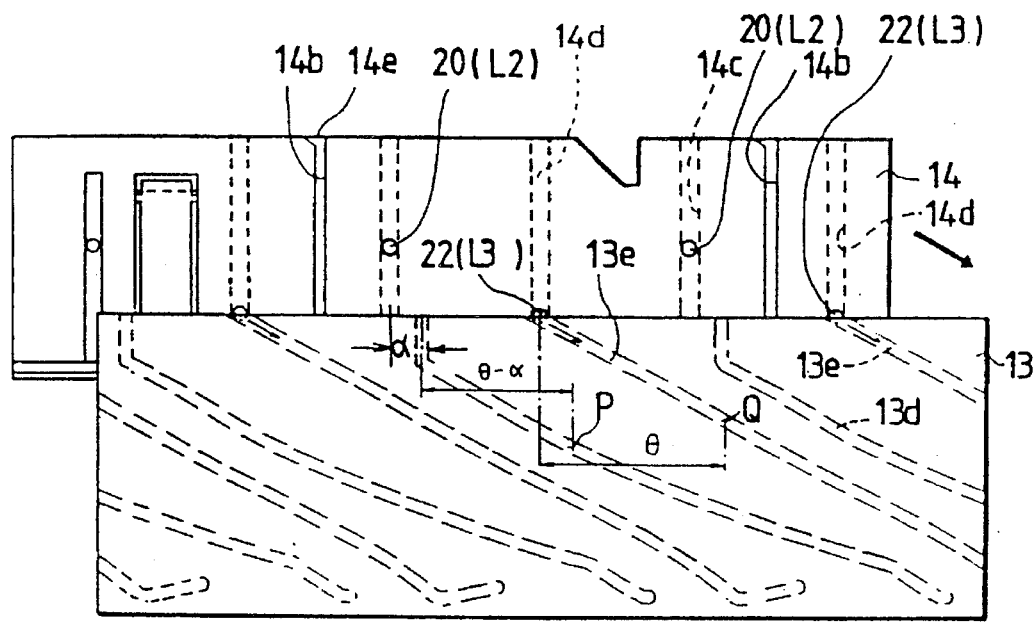
FIG. 9 is a developed view of cam grooves of a cam ring and guide pins of second and third lens groups to be inserted in the corresponding cam grooves of the cam ring, according to the present invention.
Figure 10:
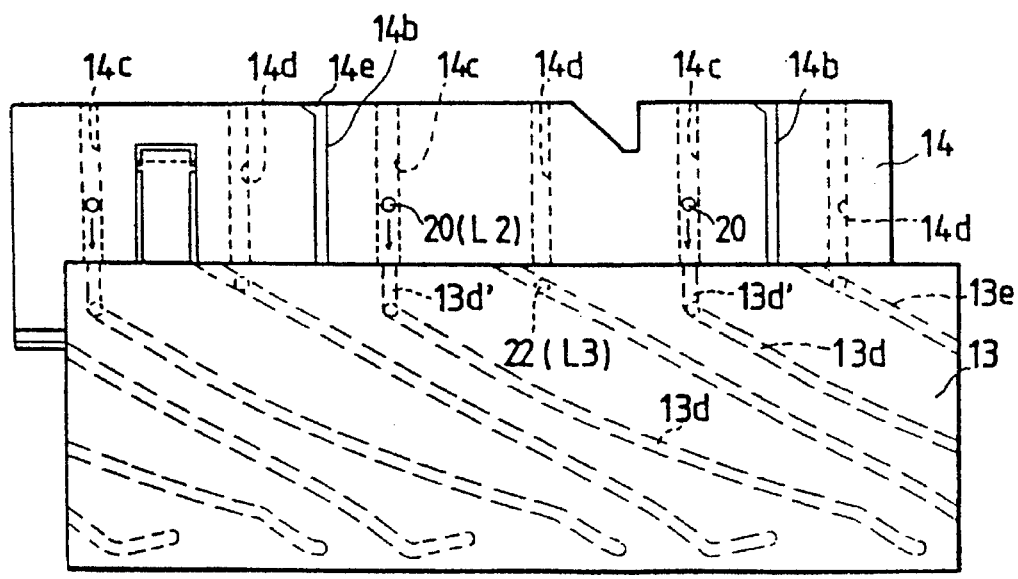
FIG. 10 is a developed view of cam grooves of a cam ring and guide pins of second and third lens groups to be inserted in the corresponding cam grooves of the cam ring, shown in a position different than FIG. 9, according to the present invention.

FIGS. 9 and 10 show the engagement processes of the second lens moving frame 19 and the third lens frame 21, both of which are biased away from each other by the compression coil spring 30, into the associated inner cam grooves 13d and 13e of the cam ring 13. Upon engaging the second lens moving frame 19 and the third lens frame 21 in the inner cam grooves 13d and 13e, the cam pins 22 on the linear movement keys 21a of the third lens frame 21, which is guided by the linear movement guide grooves 14d of the linear movement guide ring 14, are first inserted in the inner cam groove 13e. The cam ring 13 is then rotated relative to the linear movement guide ring 14. Thereafter, the cam pins 20 on the linear movement keys 19a of the second lens moving frame 19, which is guided by the linear movement guide grooves 14c of the linear movement guide ring 14, are inserted in the inner cam groove 13d. Namely, as can be seen in FIG. 9, the ends of the linear movement guide grooves 14d are registered with the ends of the corresponding inner cam groove 13e, and the cam pins 22 (i.e., third lens group L3), which is guided by the linear movement guide grooves 14d, are inserted in the end of the inner cam groove 13e. In this state, the linear movement guide ring 14 is rotated relative to the cam ring 13 by an angle α so that the ends of the linear movement guide grooves 14c are registered with the end of the inner cam groove 13d. Consequently, the cam pins 22 are moved into the inner cam groove 13e. Thereafter, the second lens moving frame 19 (i.e., second lens group L2) is pressed towards the cam ring 13, so that the cam pins 20 are moved in the linear portion 13d' of the inner cam groove 13d, as shown in FIG. 10. Thereafter, the linear movement guide ring 14 is further rotated relative to the cam ring 13 to complete the assembly.

Assuming that the positions (i.e., reference positions) of the cam pins 20 and 22 at the longest focal length position of the zoom lens barrel, as constructed above, are P and Q, respectively, the distance (i.e., angle) θ of the inner cam groove 13e, in which the cam pins 22 are first inserted between the point Q and the open end of the inner cam groove 13e, is larger than the distance (i.e., angle) θ−α of the inner cam groove 13d in which the cam pins 20 are secondly inserted between the point P and the open end of the inner cam groove 13d. Due to the angle difference, the cam pins 22 (i.e., third lens group L3) are first introduced into the inner cam groove 13e. Thereafter, the cam pins 20 (i.e., second lens group L2) are introduced in the inner cam groove 13d.

As can be understood from the above discussion, in a zoom lens barrel having three lens groups according to the present invention, since the cam ring is moved in the optical axis direction while rotating, the inclination angles of the cam grooves for the second lens group and the subsequent lens group or groups, which are formed on the cam ring, can be decreased. Accordingly, the cam ring can be rotated with a small drive force. Moreover, since the first lens group L1 is screw-engaged by the cam ring through the helicoids, large axial displacements of the first, second and third lens groups L1, L2 and L3 can be obtained by a small angular and linear displacement of the cam ring.

Furthermore, since all of the three movable lens groups are guided by the linear movement guide member, which is rotatable relative to the cam ring and movable together with the cam ring in the axial direction, the linear movement mechanism can be simplified. In addition to the foregoing, since a guide means is provided on the linear movement guide member to determine a position at which the cam ring and the first lens group supporting frame (i.e., first lens frame) are engaged in the circumferential direction, the assembly can be simplified.

I claim:

1. A zoom lens barrel, comprising:

a cam ring that is threadedly engaged to a female helicoid formed in a stationary barrel mechanism;

linear movement guide means, mounted for rotation relative to said cam ring, and for movement in an optical axis direction together with said cam ring;

at least three movable lens groups, including first, second and third lens groups that are guided in said optical axis direction by said linear movement guide means, said first, second and third lens groups being located in this order from an object side of said zoom lens barrel;

a first lens frame that holds said first lens group and is provided with a helicoid, wherein another helicoid is formed on said cam ring to engage with said helicoid of said first lens frame; and, a plurality of cam grooves formed on said cam ring to drive lens groups behind said first lens group.

2. The zoom lens barrel of claim 1, wherein said linear movement guide member is comprised of a linear movement guide ring having linear movement guide grooves for said at least three lens groups provided on inner and outer surfaces of said linear movement guide ring.

3. The zoom lens barrel of claim 2, wherein a linear movement guide groove for said first lens group is provided on said outer surface of said linear movement guide ring, and wherein linear movement guide grooves for said second and third lens group are provided on said inner surface of said linear movement guide ring.

4. The zoom lens barrel of claim 1, wherein a direction of said helicoid thread formed on said stationary barrel mechanism is opposite to a direction of said helicoid thread formed on said cam ring.

5. The zoom lens barrel of claim 1, wherein three lens groups are provided in said barrel.

6. The zoom lens barrel of claim 5, wherein said cam ring is provided with open-ended cam grooves for said second and third lens groups.

7. The zoom lens barrel of claim 6, further comprising:

second and third lens frames that hold said second and third lens groups, respectively, wherein said second and third lens frames are provided with cam pins which are fitted in said cam grooves of said cam ring for said second and third lens groups, respectively, and wherein said lens frames are linearly guided.

8. The zoom lens barrel of claim 7, wherein said cam pins are oriented such that they cannot be simultaneously fitted in said open ends of the corresponding cam grooves for said second and third lens groups.

9. The zoom lens barrel of claim 8, wherein when said cam ring is rotated relative to said second and third lens groups, one of said cam pins for said second and third lens groups is fitted in said open end of said corresponding cam groove after another of said cam pins is fitted in said open end of said corresponding cam groove.

10. The zoom lens barrel of claim 1, wherein said stationary lens barrel mechanism comprises a stationary lens barrel secured to a helicoid ring.

11. A zoom lens barrel, comprising:

a rotatable cam ring having at least two open-ended cam grooves provided on an inner peripheral surface thereof;

two movable lens frames having cam pins each of which are fitted in said open ends of said cam grooves of said cam ring; and, a linear movement guide means for linearly guiding said movable lens frames in an optical axis direction without rotating;

wherein said open ends of said cam grooves are located so that said cam pins cannot simultaneously engage with said open ends of said corresponding cam grooves at a single angular position of said cam ring.

12. The zoom lens barrel of claim 11, wherein when said cam ring is rotated relative to said movable lens frames, one of said cam pins is fitted in said open end of said corresponding cam groove, after said other cam pin is fitted in said open end of said corresponding cam groove.

13. The zoom lens barrel of claim 11, wherein said open ends of said cam grooves open into an axial end face of said rotatable cam ring.

14. A zoom lens barrel, comprising:

a cam ring that is threadedly engaged to a female helicoid formed in a stationary barrel mechanism;

wherein a direction of said female helicoid thread formed on said stationary barrel mechanism is opposite to a direction of a helicoid thread formed on said cam ring;

a linear movement guide means, rotatable relative to said cam ring, for movement in an optical axis direction together with said cam ring;

at least three movable lens group, including first, second and third lens groups that are guided in said optical axis direction by said linear movement guide means, said first, second and third lens groups being located in this order from an object side of said zoom lens barrel;

a first lens frame that holds said first lens group and is provided with a helicoid, wherein another helicoid is formed on said cam ring to engage with said helicoid of said first lens frame; and, a plurality of cam grooves formed on said cam ring to drive lens groups behind said first lens group.

* * * * *

UNITED STATES PATENT AND TRADEMARK OFFICE
CERTIFICATE OF CORRECTION

PATENT NO. : 5,488,513
DATED : January 30, 1996
INVENTOR(S) : H. TANAKA

It is certified that error appears in the above-indentified patent and that said Letters Patent is hereby corrected as shown below:

At column 7, line 31 (claim 2, line 2), change "member" to ---means---.

Signed and Sealed this

Twenty-eighth Day of January, 1997

Attest:

BRUCE LEHMAN

*Attesting Officer*     *Commissioner of Patents and Trademarks*